Sept. 2, 1952  P. ROMAN  2,609,489
VISUAL INDICATOR AND CONTROL FOR MINIATURE TRAINS
Filed June 14, 1945  4 Sheets-Sheet 1
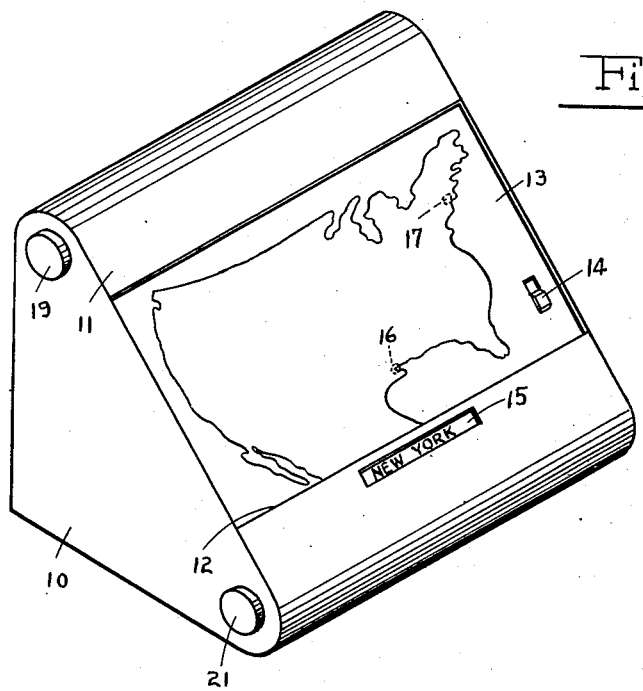
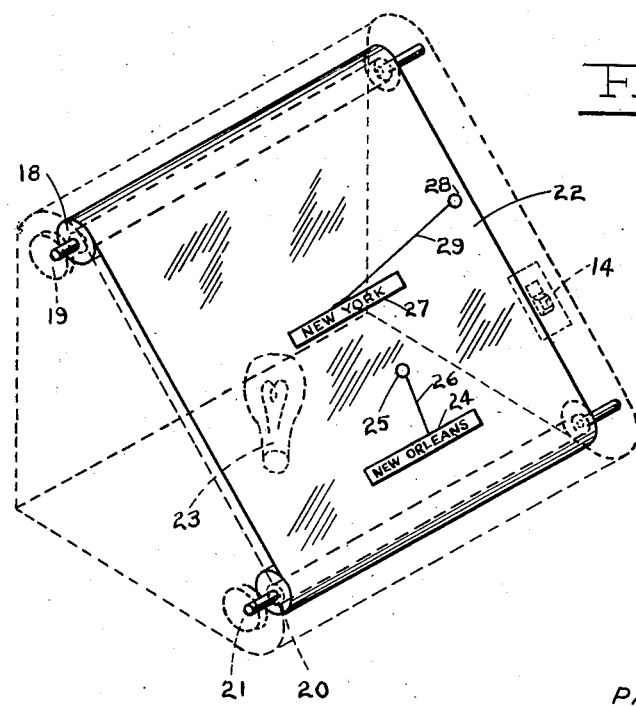
INVENTOR.
PAUL ROMAN
BY
*Van Deventer & Grier*
ATTORNEYS Sept. 2, 1952 P. ROMAN 2,609,489
VISUAL INDICATOR AND CONTROL FOR MINIATURE TRAINS
Filed June 14, 1945 4 Sheets-Sheet 2
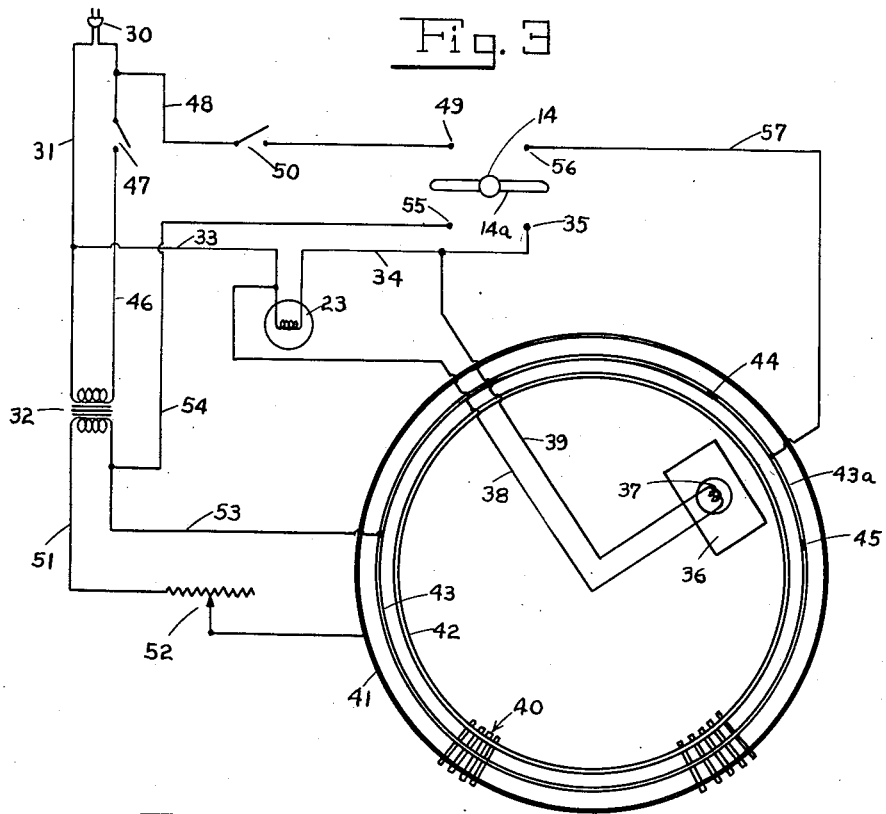
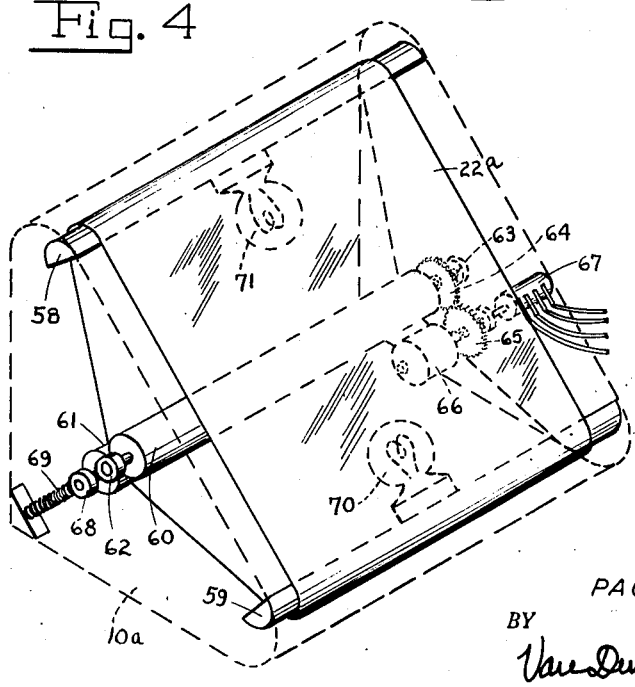
INVENTOR.
PAUL ROMAN
BY Van Deventer + Grier
ATTORNEYS Sept. 2, 1952 P. ROMAN 2,609,489
VISUAL INDICATOR AND CONTROL FOR MINIATURE TRAINS
Filed June 14, 1945 4 Sheets-Sheet 3

INVENTOR.
PAUL ROMAN
BY
Van Deventer + Grier
ATTORNEYS

Sept. 2, 1952 P. ROMAN 2,609,489
VISUAL INDICATOR AND CONTROL FOR MINIATURE TRAINS
Filed June 14, 1945 4 Sheets-Sheet 4

INVENTOR.
PAUL ROMAN
BY
Van Deventer + Grier
ATTORNEYS

Patented Sept. 2, 1952

2,609,489

UNITED STATES PATENT OFFICE 2,609,489

VISUAL INDICATOR AND CONTROL FOR MINIATURE TRAINS

Paul Roman, Tuckahoe, N. Y., assignor to Ruth M. Roman, Scarsdale, N. Y.

Application June 14, 1945, Serial No. 599,371

14 Claims. (Cl. 246—122)

This invention relates to improvements in devices for controlling the operation of miniature vehicles, and has for an object the provision of an illuminated visual indicator adapted to be set for the proposed itinerary of said vehicle, the provision of switching means for extinguishing the illuminating means and supplying energy to said vehicle and the provision of means controlled by the vehicle for interrupting the supply of current thereto, thereby causing the vehicle to stop at its proposed destination.

Another object of the invention is the provision in a control system for electrically operated vehicles which travel on a track, of an insulated section in the track, connections between a source of current and the remainder of the track, and switching means controlled by the vehicle as it encounters said insulated section in the track for determining whether the vehicle continues to traverse the track or stops on said insulated section.

Yet another object of the invention is the provision in devices for controlling the operation of miniature vehicles, of a visual indicator, the provision of switching means for supplying energy to said vehicle during the time said visual indicator is not illuminated, and for illuminating said visual indicator as the supply of energy to the vehicle is interrupted.

A further object of the invention is the provision in a control system for electrically operated vehicles which travel on a track, of switching means, a visual indicator, and a common means to move both said visual indicator and said switching means, said common means being adapted to illuminate said visual indicator during the time energy is switched off from said track, and adapted to extinguish the illumination during the time energy is supplied to said track.

Other objects and advantages of the invention will be apparent to those skilled in the art upon a study of the following specification, and the accompanying drawings.

Referring to the drawings which are given by way of example to illustrate the invention:

Figure 1 is a perspective view of a cabinet having a panel therein comprising a map and an opening or window in the cabinet through which an operator may see a movable curtain within the device and set the same for a wanted city;

Figure 2 is a phantom view of the cabinet showing the movable opaque curtain and how the names of cities and cut-outs, or transparencies, in the curtain register with the city when its name is positioned in the opening or window;

Figure 3 is a diagrammatic sketch of a track for a top railroad train which operates in conjunction with the apparatus shown in Figures 1 and 2;

Figure 4 is a phantom view showing a modified form of the arrangement shown in Figure 2. According to the arrangement in Figure 4, the motor moves the opaque curtain and at the same time rotates a commutator device for controlling the operation of a toy vehicle on a track;

Figure 5:
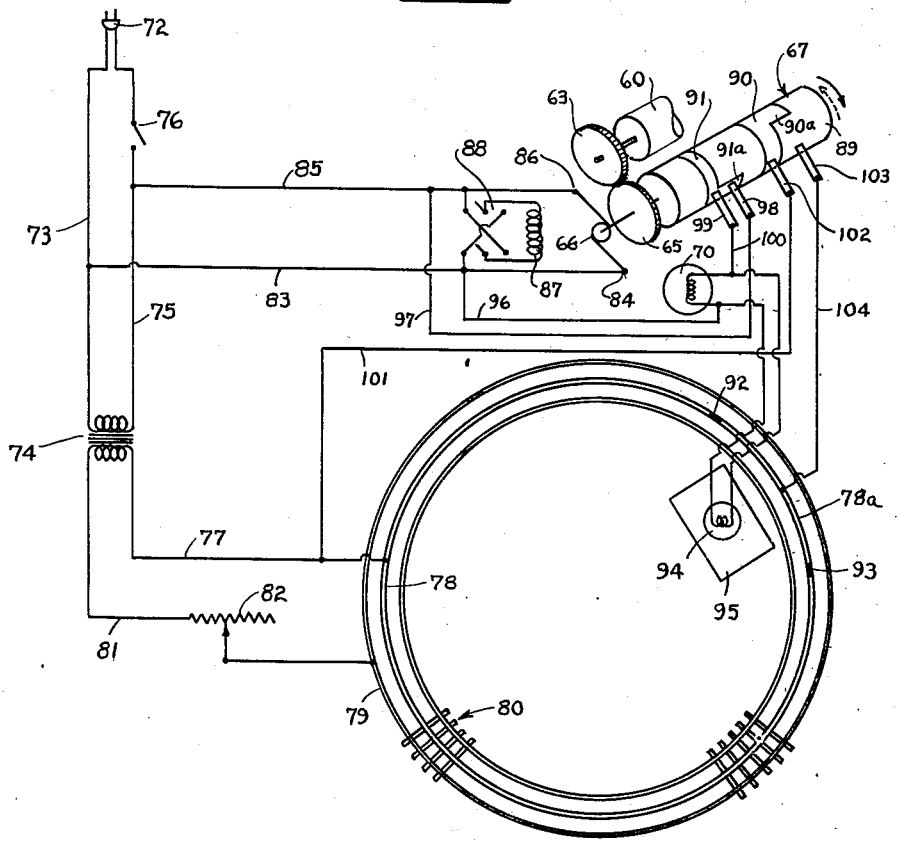
Figure 5 is a diagrammatic view similar to that shown in Figure 3, with the exception that it includes other details enabling the device to be automatically controlled instead of manually as is the case in Figure 3.

Referring to Fig. 1, a cabinet 10 is provided with a slanting front wall 11 which has an opening 12 formed therein, and within this opening is positioned a map 13 which, in the embodiment shown, is a map of the United States. On the front panel of the cabinet is mounted a switch 14 which may be a two-way switch. Beneath the opening 12 is a small elongated opening or window 15. The map may, for the purpose of illustrating the invention, be assumed to have at a point 16 thereon a representation of the city of New Orleans and at a point 17 a representation of New York city.

Within the cabinet 10 is a roller 18 near the top thereof which may be rotated by means of a knob 19 which extends through the cabinet. A second roller is positioned behind the front panel near the bottom of the cabinet and is designated by the numeral 20. This roller carries a knob 21 which extends through the end of the cabinet.

Carried on the rollers 18 and 20 is an opaque curtain 22 which carries a plurality of transparent or translucent areas upon which the names of cities are printed or otherwise impressed by means of opaque letters, and corresponding cut-outs or translucent areas which function to illuminate the representation and/or location of the corresponding city on the map. With the curtain opaque and the transparent or translucent portions having the names of the cities printed thereon and corresponding translucent areas or cut-outs, the curtain is moved on supporting rollers beneath and preferably in contact with a superimposed map so that illumination placed behind or below the curtain will show through said transparent or translucent areas and corresponding areas, as will be evident as the explanation is continued in this specification. Behind the curtain 22 is a source of illumination shown as a lamp 23. However, this source of illumination may comprise one or more incandescent lamps or other sources of light. For the purposes of illustrating the registration of the names of the cities and the registration of the illuminated spots with the location of the city itself on the map 13, the curtain 22 carries a transparent rectangle 24 with the name New Orleans in opaque letters printed thereon. Spaced from the rectangle 24, is a transparent or cut-out spot 25 in the curtain 22. For convenience in orienting or indicating the relation of the spot with the rectangle, they are joined by a line 26 drawn or otherwise impressed on the curtain 22. A second rectangle 27 has impressed thereon the name New York, and spaced apart therefrom on the curtain 22, is a transparent or cut-out spot 28. The spot 28 and the rectangle 27 are joined by a line 29. The switch 14, which as stated above may be a two-way switch, is adapted, when in one position, to control the supplying of current to the illuminating means in the cabinet 10, and when in another position to control the supplying of energy to the track upon which the vehicle moves.

Referring now to Fig. 3, which is a circuit diagram of the system, a plug 30 is adapted to be connected to a source of current. From the plug 30, a conductor 31 may lead to one end of the primary of a transformer 32, and a branch conductor 33, connected to the conductor 31, may lead to the lamp 23 which has been herein above described as being positioned within the cabinet 10. From the lamp 23 a conductor 34 connects to a point 35 of the switch 14. A station 36 has a lamp 37 positioned therein for illuminating the same and this lamp is connected in parallel with the lamp 23 by means of conductors 38 and 39 connected to the conductors 33 and 34 respectively.

A railroad track generally designated by the numeral 40, has an outer rail 41, an inner rail 42 and an intermediate or "third" rail 43. The third rail 43 has a section 43a which is isolated from the third rail by means of insulating sections 44 and 45.

The other terminal of the primary of the transformer 32 is connected via a conductor 46 to the other side of the source of current via the plug 30. Included in the line 46 is a switch 47 by means of which current, supplied to the primary, may be controlled. A conductor 48 is connected to the conductor 46, ahead of the switch 47, and leads to the point 49 in the switch 14. The line 48 may be provided with a switch 50 for controlling the supplying of current to the switch point 49.

The secondary winding of the transformer has one terminal thereof connected via a conductor 51 to the outside rail 41, and for controlling the speed of the vehicle, a suitable rheostat 52 may be connected in series therewith. The other terminal of the secondary is connected via a wire 53 to the third rail 43. A conductor 54 is connected from the conductor 43 to a point 55 in the switch 14. A point 56 in the switch 14 is connected via a conductor 57 to the insulated section of the third rail 43a.

With the switches 47 and 50 closed and a train on the track 40, at rest on the insulated section 43a, and with the arm 14a of the switch in contact with the points 49 and 35, the lamp 23, behind the curtain 22 in the cabinet 10, is illuminated. Since the lamp 37 in the station 36 (which is positioned adjacent to the insulated section 43a of the track) is connected in parallel with the lamp 23, the station is also illuminated. With the curtain 22 positioned so that the transparent spot 28 is underneath the point 17, on the map 13, the name New York in the panel 27 appears in the window 15, see Fig. 1. This indicates that the train is standing at the station in New York.

Now suppose the operator determines that the train shall be slated to run from New York to New Orleans, he throws the switch 14 and this causes the switch arm 14a to leave the points 49 and 35 and to connect the points 55 and 56 together. When this occurs the lights 23 and 37 are extinguished and current is supplied to the insulated section 43a, thereby supplying current to the train and causing it to start operating. Since the potential of the insulated section 43a and the potential of the third rail are the same, the train will operate as long as the switch 14 is in the position connecting 55 and 56 together. Now the operator, by means of the knob 19, advances the curtain 22 until the word "New Orleans" appearing in the panel 24, is visible through the window 15 in front of the cabinet 10. He then throws the switch 14 to its original position (causing the arm 14a to disconnect 55 and 56 and to reconnect the points 35 and 49). This causes the light 23 within the cabinet, and the light 37 in the station, to be illuminated. The light 23 via the hole or transparency 25, in the curtain 22, illuminates the spot 16 on the map 13, and indicates that the train is approaching New Orleans. Thereafter, as soon as the train encounters the insulated section 43a, from which the current supplied was interrupted by the movement of the switch just described, it stops, and since the station 36 is adjacent thereto, the train stops in the station at New Orleans, as indicated on the map 13, on the front of the cabinet 10.

In the modification shown in Fig. 4, the curtain 22a is assumed to have transparent spots such as 25, 28, and panels such as 24, 27, bearing the names of the cities represented by the spots 25, 28, have been omitted from Fig. 4 for the sake of clarity. The curtain 22a passes over spaced arcuate rails 58 and 59, and passes between rollers 60 and 61. The roller 60 is supported on suitable bearings 62, 63 and carries a gear 64 which meshes with a gear 65 carried on the shaft of a motor 66. The motor shaft also carries a commutator 67 for controlling circuits which will presently be described in connection with Fig. 5. The roller 61 is carried on suitable bearings, one of which is designated by the numeral 68, and these bearings are slidably supported within the cabinet and are urged by spring means, one of which is shown at 69, in a direction to hold the roller 61 in contact with the curtain 22a, so as to cause it to be driven by the roller 60, so that as long as the motor 66 is running it rotates the gear 65 through a gear reduction which is built into the motor. Due to the fact that the gear 65 meshes with the gear 64 which is fixed to the shaft carrying the roller 60 the roller 60 is continuously and slowly rotated, and the frictional engagement of this roller with the curtain under the urge of the spring means 69 causes the curtain to be slowly moved along beneath the map which is superimposed on it in the same manner as the map 13 is superimposed on the curtain 22 in Figures 1 and 2. The rails 58 and 59 conveniently support lamps 70 and 71 for supplying illumination within the cabinet 10a. The cabinet 10a may be identical in shape with the cabinet 10, shown in Fig. 1, and it may include the same map arrangement as shown in Fig. 1, and also the window like the window 15 through which the names of the cities may be seen. However, in the cabinet 10a there are no knobs like the knobs 19 and 20, nor is there a switch 14. This is due to the fact that the curtain is moved by the motor 66 instead of manually, by the operator. So the arrangement shown in Fig. 4, in fact, constitutes an automatic version of the manual arrangement shown in Figs. 1 and 2.

Referring now to Fig. 5, which shows the circuits employed in the arrangement shown in Fig. 4, a connector plug 72 is adapted to be plugged into a source of current. A conductor 73 leads from the plug 72 to one terminal of the primary of a transformer 74, and a second conductor 75 leads from the plug 72 to the other terminal of the primary and includes a switch 76.

One terminal of the secondary of the transformer 74 is connected via a conductor 77 to the center or third rail 78 of the track 80. The other terminal of the secondary is connected via a conductor 81 and through a rheostat 82 to one of the outer rails 79 of the track 80.

A branch line 83 leads from the conductor 73 to the terminal 84 of the motor 66. A second conductor 85 leads from the conductor 75 to the terminal 86 of the motor 66. The field 87 of the motor is connected to the mid points of a double pole, double throw reversing switch 88. The terminals at one end of the reversing switch 88 are connected to the conductors 83 and 85, and the terminals at the other end of the switch 88 are connected to the terminals on the first end by the usual cross wires so that when the switch blades are thrown to the left, as shown in Fig. 5, the field 87 is connected in one relation to the armature of theh motor 66 and will cause the armature to rotate in one direction, for example, in the direction indicated by the solid arrow. When the switch blades are thrown to the right, as shown in Fig. 5, the field 87 is connected in the opposite relation to the armature of the motor 66 causing the latter to rotate in the direction of the dotted arrow. The commutator 67 may consist of a rotor 89 carrying a metallic segment or insert 90 and a second metallic segment or insert 91, axially spaced apart from the segment 90. The segment 90 has a portion 90a which extends axially to the right as seen in Fig. 5, and likewise the insert 91 has a projecting portion 91a extending in the same direction, although these projections are angularly displaced from one another.

In Fig. 5 is shown the lamp 70. So as not to crowd the sketch, the lamp 71 is omitted but it will be understood that the lamp 71 is connected in parallel with the lamp 70 so that when current is supplied to one of them, they are both illuminated.

The third rail 78 has a section 78a which is isolated from the third rail by means of insulating sections 92 and 93. Along side the track 80, adjacent to the insulated section 78a, is a station 95 which may be illuminated by means of a lamp 94. The lamp 94 is connected in parallel with the lamp 70. A branch conductor 96 is connected to the conductor 83 and to one terminal of the lamp 70, and a conductor 97 is connected to the conductor 85 and to a brush 98 which is adapted to be contacted by the extension 91a of the segment 91, as the commutator rotor 89 rotates. A brush 99 bears on the segment 91 and is connected by means of a jumper 100 to the other terminal of the lamp 70 so that when the switch 76 is closed and the brushes 98 and 99 are connected together by the segment 91 and its projection 91a, the lamps 70 and 94 (and also the lamp 71 if it is used) are illuminated.

A conductor 101 has one end connected to the conductor 77 (which is connected to the third rail 78), and has its other end connected to a brush 102. A second brush 103 is connected via a conductor 104 to the insulated section 78a of the third rail. As theh rotor 89 of the commutator rotates, the insert 90 and its extension 90a connect the brushes 102 and 103 together and supply current to the insulated section 78a.

With the commutator rotor 89 in the position shown in Fig. 5, the lamps 70 and 71 behind the curtain 22a and also the lamp 94 in the station 95, are illuminated. Since the curtain 22a is synchronized with the commutator 67, the name of a city appears in the window (corresponding to the window 15, as shown in Fig. 1). As soon as the extension 91a of the segment 91 leaves the brush 98, the lamps behind the curtain 22a and also the lamp in the station 95, are extinguished. Following this the brush 103 is contacted by the extension 90a of the segment 90 and the train, which is standing at rest at the station, (due to the fact that it previously stopped when it encountered the insulated section 78a) immediately starts up due to the fact that current is delivered to the insulated section. Now as long as current is supplied to the insulated section by the extension 90a (and this extension may be made as long circumferentially as desired), the train will continue to make laps around the track 80. However, after the extension 90a leaves the brush 103, the train will stop when it again encounters the insulated section 78a and immediately following this the extension 91a contacts the brush 98 and the station and the representation of the next city to which the train is supposed to have traveled, are both illuminated.

Figure 6:
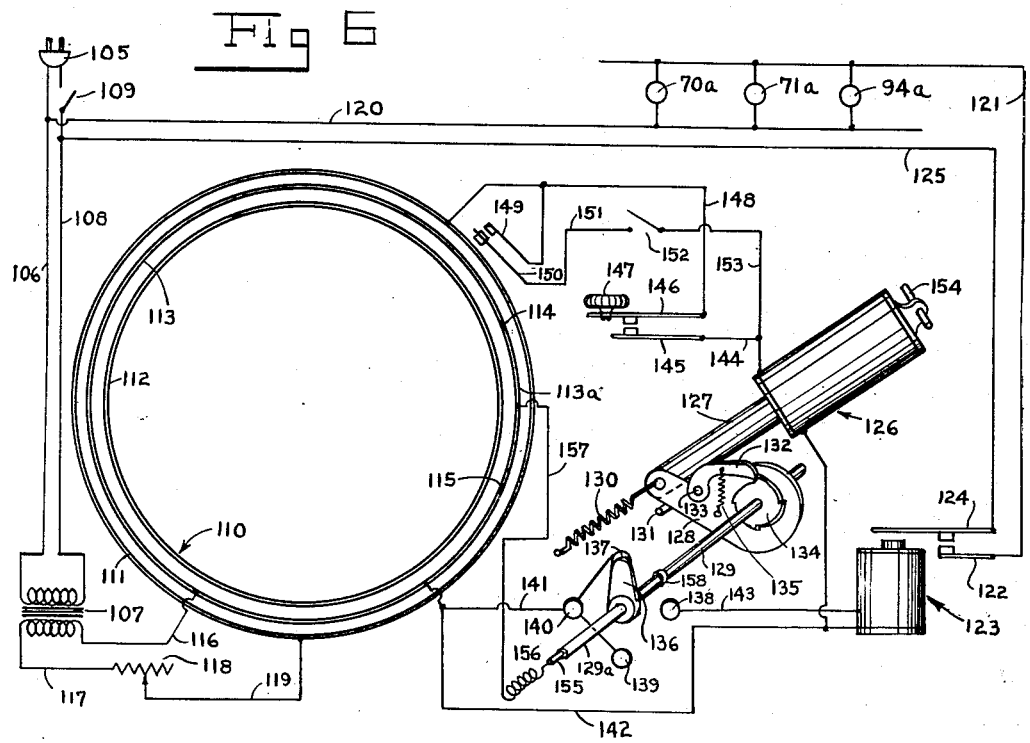
Figure 6 is a diagrammatic sketch of a further modification of the vehicle control employing a stepping switch.

Referring to Fig. 6, which shows a further modification, a connector plug 105 is adapted to be plugged into a convenient source of current and from this plug a conductor 106 may lead to one terminal of the primary of a transformer 107. The other terminal of the primary is connected via a conductor 108 to the plug 105, and includes a switch 109.

A track 110 includes outer rails 111, 112, and a center or third rail 113. The third rail 113 has a section 113a which is isolated from the third rail by means of insulating sections 114 and 115. The secondary of the transformer 107 has one terminal connected via a conductor 116 to the third rail 113, and its other terminal is connected via a conductor 117 to a rheostat 118, and this rheostat is, in turn, connected to one of the outer rails via a conductor 119.

A branch line 120 is connected to the conductor 106 and to one terminal of each of the map lights 70a and 71a, and the station light 94a. The other terminals of the lamps 70a, 71a and 94a are connected via a conductor 121 to one contact arm 122 of a relay 123. The other contact arm 124 of this relay is connected via a conductor 125 to the conductor 108. A stepping relay 126 may be a solenoid having a plunger 127 operatively connected to an arm 128 which may be journaled on a shaft 129. A return spring 130 is connected to the plunger for causing it to return to its normal position in contact with a stop pin 131. The arm 128 carries a pawl 132 which is pivoted at 133 and is urged toward a ratchet wheel 134 by a spring 135. The ratchet wheel 134 is keyed to the shaft 129 and as the solenoid plunger 127 is moved into the winding the ratchet 134, engaged thereby, is caused to rotate in the embodiment shown, a quarter of a turn, or 90 degrees. The shaft 129 carries a contact arm 136 which contacts a contact point 137 and as the shaft is advanced a quarter turn it leaves the contact point 137 and makes contact with a contact point 138. As the shaft is advanced another 90 degrees it leaves the contact point 138 and makes contact with a contact point 139. When the shaft is advanced another 90 degrees the contact arm leaves the contact point 139 and makes contact with a contact point 140. Thence, when the shaft is moved yet another 90 degrees (making a total of 360 degrees), the contact arm leaves the contact 140 and again establishes contact with the contact arm 137 etc.

The contact points 137, 139 and 140 are connected together and are in turn connected via a conductor 141 to the third rail 113. One terminal of the winding of the relay 123, and also one terminal of the winding of the stepping relay 126, are connected via a conductor 142 to the third rail 113. The other terminal of the winding of the relay 123 is connected via a conductor 143 to the contact point 138. The other terminal of the winding of the relay 126 is connected via a conductor 144 to a switch arm 145. A cooperating switch arm 146 is connected via a conductor 148 to the outer rail 111 so that when the knob 147 on the switch arm 146 is pressed, current is supplied to the winding of the stepping relay 126. A contact arm 149 is connected to the conductor 148, and a contact arm 150 is connected via a conductor 151 to a switch 152 and this switch is, in turn, connected to the conductor 144 via a conductor 153. The winding of the stepping relay 126 may be pivotally supported at 154 to take care of the swing of the arm 128, when this relay is actuated. A brush 155 may be urged into contact with the end of the section 129a of the shaft 129 by means of a spring 156. This brush is connected via a conductor 157 to the insulated section 113a of the third rail. The section 129a of the shaft is insulated from the main shaft 129 by means of an insulation 158.

With the contact arm 136 of the stepping switch in contact with the contact point 138, and with the train at rest on the insulated section 113a of the track, the winding of the relay 123 is energized thereby attracting the arm 124 and causing it to contact the arm 122. This supplies current to the lamps 70a, 71a, and the station lamp 94a.

Assuming that the operator has set his map to indicate the city in which the train is sitting, the operator depresses the knob 147 thereby closing the contact arms 145 and 146, and energizing the winding of the relay 126. This causes the plunger 127 to advance to the right, as seen in Fig. 6, thereby stepping the contact arm 136 forward 90 degrees and causing it to establish contact with the contact point 139, thereby supplying current to the insulated section 113a of the third rail. This causes the train to operate and incidentally the train will continue to make laps of the track until the insulated section 113a is deprived of current. The depriving of the insulated section of current may be accomplished either manually or automatically. When the operator wishes to accomplish this manually, he may depress the handle or button 147. If he does this once, the contact arm 136 will advance to the contact 140 and the insulated section 113a will continue to receive current. The same will occur if he depresses the button 147, again, because the contact arm 136 will then advance to the position 137 (the position shown in the circuit, Fig. 6). However, the next time he depresses the button 147 the contact arm advances to the position 138 thereby depriving the insulated section 113a, of current, and this will cause the train to stop when it subsequently encounters the insulated section 113a. Due to the advancing of the arm 136 to the position 138, the relay 123 is energized and the lamps 70a, 71a, and 94a are illuminated.

From the above description it will be seen that the operator can manually control the energization of the insulated section 113a, and may allow the train to make as many, or as few, laps as he desires because if he wants it to make a few laps he may quickly push the button 147 several times.

Now, if it is desired to automatically control the device the switch 152 may be closed. The contact arm 150 is so arranged that as the train passes it, it is momentarily swung into contact with the arm 149 thereby energizing the winding of the stepping relay 126. Since the contact arm 136 traverses three contact points connected to the insulated section 113a, the train will stop on the insulated section after it has made three laps, and all of this is automatic. And, the fourth time the train encounters the insulated section it will stop and the map lights and the station light are illuminated.

If the operator wishes to reduce the number of laps on automatic operation he has the option to overridingly control the automatic operation because each time he depresses the button 147, the number of laps is reduced by one.

Although I have herein shown and described an embodiment and several modifications thereof, it is obvious that many other changes may be made, in the arrangements herein shown and described, by those skilled in the art without departing from the spirit of the invention as defined in the following claims.

What is claimed is:

1. In a device for controlling the operation of miniature vehicles, a metallic track having outer rails and having a main third rail portion and a second third rail portion insulated from said main portion, a station adjacent to said insulated portion and having a light therein connected in a circuit with a source of current, means for constantly supplying current from said source to said track with the exception of said insulated portion, a visual indicator supported remotely from said track and having a light therein connected in multiple with said first light, said indicator including a stationary map and a movable opaque curtain supported beneath said map and having transparent areas therein some of which register with the positions of given cities on the map, dual switching means including one set in said first circuit and a second set in a circuit between said source and said second third rail portion, said switching means being adapted first to extinguish said lights and to supply current to said insulated portion and adapted secondly to deprive said insulated portion of current and to supply current to said lights, and motor means for moving said curtain and for causing said switching means to perform said switching operations sequentially with predetermined time delays between said operations.

2. In a device for controlling the operation of miniature vehicles, a track having outer rails and a third rail a portion of which is insulated from the main portion thereof, a station adjacent to said insulated portion and having a light therein connected in a circuit with a source of current, a visual indicator supported in a casing remote from said track and having a light therein connected in multiple with said first light, said indicator including a stationary map and a movable opaque curtain beneath said map moved in timed relation with the movement of the vehicle along the track and having light-transmitting areas therein some of which register with the position of given cities on the map and others of which register with an opening in the casing of said indicator and bear the printed name of the city with which the first-mentioned area registers, circuit means for constantly supplying current from said source to said track and to said third rail with the exception of said insulated portion, rotary switching means having circuits between said source and said light and circuits between said source and said insulated portion connected thereto for normally supplying current to said light, and motor means for moving said curtain and for driving said rotary switching means and thereby causing said switching means to first extinguish said lights and supply current to said insulated portion and for secondly depriving said insulated portion of current and again supplying current to said light, said motor means being adapted to perform said operations sequentially and with predetermined time delays between said operations.

3. In a device for controlling the operation of miniature vehicles, a track having outer rails and a third rail a portion of which is insulated from the main portion thereof, a station adjacent to said insulated portion and having a light therein, a visual indicator carried in a casing spaced apart from said station and said track and also having a light therein connected in multiple with the light in said station and adapted to be illuminated in time with the illumination of the light in said station, said indicator including a stationary map and a movable opaque curtain beneath said map moved in time with the movement of the vehicle along the track and having transparent areas therein some of which register with the position of any one of a number of cities on the map and others of which register with an opening in the casing of said indicator and bear the printed name of the city with which the first-mentioned areas register, means for constantly supplying current to said track and to said third rail with the exception of said insulated portion, switching means having circuits between a source of current and said lights connected thereto for normally supplying current to said lights, other switching means having circuits connected thereto for supplying current to said insulated portion of the third rail, and motor-driven means operatively connected to said curtain for moving the same and cooperating with said contact means for causing said contact means to first extinguish said lights and supply current to said insulated portion and for secondly depriving said insulated portion of current and again supplying current to said lights, said motor-driven means being adapted to perform said operations sequentially and with predetermined time delays between said operations.

4. In a device for controlling the operation of miniature vehicles, a track having a third rail, a comparatively short portion of which is insulated from the main portion of the third rail, a station adjacent to said insulated portion and including a source of illumination, said insulated portion being adapted when deprived of current to cause said vehicle to stop at said station, a motor-driven commutator switching device having circuits connected thereto and to said track, said third rail, the insulated portion of said third rail and to said source of illumination for supplying current to said track and said third rail with the exception of said insulated portion, for subsequently depriving said source of illumination of current and supplying current to said insulated portion, and thereafter for depriving said insulated portion of current and supplying current to said source of illumination, and an illuminated visual indicator also rotated by said motor for indicating the supposed location of the vehicle at the time it stops and for advancing, as the vehicle again starts operating, to a point indicating the destination of said vehicle as it again stops.

5. In a device for controlling the operation of miniature vehicles, a track having a third rail a portion of which is insulated from the main portion thereof, a station adjacent to said insulated portion and having a light therein, a visual indicator spaced apart from said station and said track, said indicator being comprised of a casing having an upper wall with a panel formed therein and containing a chart or map, an opaque curtain movably supported in said casing beneath said chart and having light-transmitting areas correlated with predetermined points on said chart, said visual indicator also having a light therein below said curtain and connected in multiple with and adapted to be illuminated in time with the light in said station, means for constantly supplying current to said track and to said third rail with the exception of said insulated portion, contact means having circuits connected thereto for normally depriving said light of current, and supplying current to said insulated portion and for secondly depriving said insulated portion of current and again supplying current to said light, and electromotive means cooperating with said contact means for causing the latter to perform said operations sequentially and with predetermined time delays between said operations.

6. In a device for controlling the operation of miniature vehicles, a track having a third rail a portion of which is insulated from the main portion thereof, a station adjacent to said insulated portion and having a light therein, a visual indicator spaced apart from said station and said track and comprised of a cabinet having an upper wall with a panel formed therein and containing a chart or map and having a narrow elongated window therebeneath, an opaque curtain movably supported in said cabinet beneath said chart and having light-transmitting areas therein correlated with predetermined points on said chart and having designations of said points printed in other light-transmitting areas thereon and adapted to show in said window when the corresponding light-transmitting area in said curtain is correlated with the position of its point on said chart, roller means engaging said opaque curtain, said indicator also having a light therein connected in multiple with and adapted to be illuminated in time with the light in said station, means for constantly supplying current to said track and to said third rail with the exception of said insulated portion, movable contact means having circuits connected thereto for normally supplying current to said light, and motor means operatively connected to said roller means for moving said curtain and also operatively connected to actuating means for said contact means for causing the latter to first extinguish said light and supply current to said insulated portion and for secondly depriving said insulated portion of current and again supplying current to said light, the contacts in said contact means being arranged to perform said operations sequentially and with predetermined time delays between said operations.

7. In a device for controlling the operation of miniature vehicles, a track having a third rail a portion of which is insulated from the main portion thereof, a station adjacent to said insulated portion and having a light therein, a visual indicator spaced apart from said station and said track, said indicator being comprised of a casing having an upper wall with a panel formed therein and containing a chart or map, an opaque curtain movably supported in said cabinet beneath said chart and having light-transmittable areas correlated to and adapted to coincide with predetermined points on said chart, said casing also having a light therein connected in multiple with and adapted to be illuminated in time with the illumination of the light in said station, means for constantly supplying current to said track and to said third rail with the exception of said insulated portion, movable contact means having circuits connected thereto for normally depriving said lights of current and supplying current to said insulated portion and for secondly depriving said insulated portion of current and again supplying current to said lights, and motor-driven means connected to said curtain for moving the same and also connected to said movable contact means, said last mentioned means having its contacts arranged to effect said operations sequentially and with predetermined time delays between said operations.

8. In a device for controlling the operation of miniature vehicles, a track having a third rail a portion of which is insulated from the main portion thereof, a station adjacent to said insulated portion and having a light therein, a visual indicator spaced apart from said station and said track, said indicator being comprised of a casing having at least one wall thereof with a panel formed therein and containing a chart or map, an opaque curtain movably supported in said cabinet adjacent to said chart and having light-transmittable areas correlated with predetermined points on said chart and adapted to illuminate said predetermined points, magnetomotive means for moving said curtain on its support, means for constantly supplying current to said track and to said third rail with the exception of said insulated portion, movable contact means controlled by said magnetomotive means and having circuits connected thereto for normally depriving said light of current, and supplying current to said insulated portion, and for secondly depriving said insulated portion of current and again supplying current to said light, said movable contact means having its contacts arranged to effect said operations sequentially and with predetermined time delays between said operations.

9. In a device for controlling the operation of miniature vehicles, a track having a third rail a portion of which is insulated from the main portion thereof, a station adjacent to said insulated portion and having a light therein, a visual indicator spaced apart from said station and said track and comprised of a casing having an upper wall with a panel formed therein and containing a chart or map and having a narrow elongated window therebeneath, an opaque curtain movably supported in said cabinet beneath said chart and having light-transmittable areas therein correlated with predetermined points on said chart and having designations of said points printed in translucent areas thereon and adapted to show in said window when the corresponding one of said areas in said curtain is correlated with the position of its point on said chart, roller means engaging said opaque curtain, said indicator also having a light therein connected in multiple with the light in said station and adapted to be illuminated in time with the illumination of the light in said station, means for constantly supplying current to said track and to said third rail with the exception of said insulated portion, movable contact means having circuits connected thereto for normally supplying current to said lights, and motor means operatively connected to said roller means for moving said curtain and operatively connected to said movable contact means for causing the latter to first extinguish said light and supply current to said insulated portion and for secondly depriving said insulated portion of current and again supplying current to said light, the contacts of said contact means being arranged to effect said operations sequentially and with predetermined time delays between said operations.

10. In a device for controlling the operation of miniature vehicles, a cabinet having a panel formed therein to contain a chart or map, an endless opaque curtain movably supported in said cabinet beneath said chart and having transparent areas therein correlated with starting points and/or destinations on said chart, roller means for moving said curtain, an electric motor operatively connected to said roller means, an electrical circuit between said motor and a source of current, said circuit including switching means for controlling said motor, a source of illumination in said cabinet adapted to illuminate areas on said map defined by said transparent areas, a belt track for said vehicle including a third rail having an insulated section therein, circuit connections between said source of current and said belt track including one conductor connected to at least one main rail thereof and another conductor connected to the third rail with the exception of said insulated section, switching means controlled by said motor including one switching set connected in a circuit with said source of current and the source of illumination in said cabinet and another set connected in a second circuit with said source and the insulated section of the third rail, said sets being so arranged relative to one another that when one circuit is completed by its switching set the other one is interrupted by its switching set.

11. In a control device of the character described, a casing having a panel formed in one surface thereof to contain a chart or map, an opaque curtain movably supported in said casing beneath said chart and having transparent areas therein correlated with predetermined points on said chart, motor means for moving said curtain, switching means in said casing comprised of a plurality of sections, said switching means also being controlled by said motor means, connections between one of said sections, a source of current and a first external circuit, and connections between the second of said sections, a source of current and a second external circuit, whereby said external circuits are enabled and disabled sequentially by said motor means.

12. In a control device of the character described, a casing having a panel formed in one surface thereof to contain a chart or map, an opaque curtain movably supported in said casing beneath said chart and having transparent areas therein correlated with a series of predetermined points on said chart, motor means for moving said curtain, connections between said motor means and a source of current, said connections including a switch mounted on said casing, other switching means within said casing comprised of a plurality of sections, actuating means for said switches also controlled by said motor means, connections between one of said sections, a source of current and a first external circuit, and connections between the second of said sections, a source of current and a second external circuit, whereby said external circuits are enabled and disabled sequentially by said motor means.

13. A control device according to claim 12 in which a source of illumination within the casing is connected in parallel with at least one of said sections.

14. In a control device of the character described, a casing having a panel formed in one surface thereof to contain a chart or map, an opaque curtain movably supported in said casing beneath said chart and having transparent areas therein correlated with predetermined points on said chart, said curtain also having a series of other transparent areas therein carrying opaque characters, a frame or opening in said device with which said last-mentioned transparent areas sequentially register, motor means for moving said curtain, switching means in said casing comprised of a plurality of sections, said switching means also being controlled by said motor means, connections between one of said sections, a source of current and a first external circuit, and connections between the second of said sections, a source of current and a second external circuit, whereby said external circuits are enabled and disabled sequentially by said motor means.

PAUL ROMAN.

REFERENCES CITED

The following references are of record in the file of this patent:

UNITED STATES PATENTS

| Number | Name | Date |
|---|---|---|
| 156,868 | Baade | Nov. 17, 1874 |
| 476,468 | Leek | June 7, 1892 |
| 1,364,303 | Peplinski et al. | Jan. 4, 1921 |
| 1,388,915 | Behnke | Oct. 30, 1921 |
| 1,530,315 | Grabenstein | Mar. 17, 1925 |
| 1,570,178 | Prevost | Jan. 19, 1926 |
| 1,647,172 | Caruso | Nov. 1, 1927 |
| 1,675,165 | Custer | June 26, 1928 |
| 1,710,326 | Swartwout | Apr. 23, 1929 |
| 1,865,276 | Rosenthal | June 28, 1932 |
| 1,929,759 | Swett | Oct. 10, 1933 |
| 1,941,777 | Amos | Jan. 2, 1934 |
| 2,058,523 | Stearns | Oct. 27, 1936 |
| 2,148,828 | Myers | Feb. 28, 1939 |
| 2,166,194 | Roman et al. | July 18, 1939 |
| 2,227,411 | Jones | Dec. 31, 1940 |
| 2,247,418 | Smith | July 1, 1941 |
| 2,265,598 | Firestone | Dec. 9, 1941 |
| 2,386,956 | Klamp et al. | Oct. 16, 1945 |

FOREIGN PATENTS

| Number | Country | Date |
|---|---|---|
| 601,043 | France | of 1926 |
| 790,303 | France | of 1935 |
| 464,804 | Great Britain | of 1937 |